United States Patent
Nishiyama et al.

(10) Patent No.: US 6,854,560 B2
(45) Date of Patent: Feb. 15, 2005

(54) ELECTRIC POWER STEERING APPARATUS

(75) Inventors: Akihiro Nishiyama, Okazaki (JP); Yoshinobu Shimizu, Sakai (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/785,428

(22) Filed: Feb. 25, 2004

(65) Prior Publication Data

US 2004/0226770 A1 Nov. 18, 2004

(30) Foreign Application Priority Data

Feb. 27, 2003 (JP) ........................................ 2003-051539

(51) Int. Cl.[7] .............................................. B62D 5/04
(52) U.S. Cl. ..................................... 180/446; 318/632
(58) Field of Search ............................... 180/443, 444, 180/446; 318/433, 632; 701/41, 43

(56) References Cited

U.S. PATENT DOCUMENTS

| | | | | | |
|---|---|---|---|---|---|
| 4,765,426 | A | * | 8/1988 | Shimizu | 180/446 |
| 5,764,015 | A | * | 6/1998 | Shimizu et al. | 318/587 |
| 6,091,214 | A | * | 7/2000 | Yamawaki et al. | 318/52 |
| 6,240,349 | B1 | * | 5/2001 | Nishimoto et al. | 701/41 |
| 6,272,410 | B2 | * | 8/2001 | Okanoue et al. | 701/42 |
| 6,711,484 | B2 | * | 3/2004 | Kifuku et al. | 701/41 |
| 6,744,232 | B2 | * | 6/2004 | Endo | 318/432 |
| 6,768,283 | B2 | * | 7/2004 | Tanaka et al. | 318/632 |

FOREIGN PATENT DOCUMENTS

| | | | | |
|---|---|---|---|---|
| JP | 1115771 | * | 5/1989 | B62D/5/04 |
| JP | 09-058501 | | 3/1997 | |
| JP | 2004-1630 | | 1/2004 | |

* cited by examiner

*Primary Examiner*—Avraham Lerner
(74) *Attorney, Agent, or Firm*—Rabin & Berdo, P.C.

(57) ABSTRACT

An electric power steering apparatus for performing steering assist. The apparatus is provided with an operation amount sensor for sensing an operation amount of an operation member for steering a motor vehicle; a reference assist characteristics setting section for setting reference assist characteristics; and a motor driving target value setting section for setting a motor driving target value in accordance with a corrected assist characteristics obtained by shifting the reference assist characteristics along the axis of coordinates of the operation amount. The apparatus is further provided with a shifting amount setting section for setting, when forward stroke steering is done, the shifting amount to zero, while setting, when return stroke steering is done, the shifting amount to a value at which corrected assist characteristics is obtained in which the absolute value of the motor driving target value corresponding to the operation amount is increased.

5 Claims, 6 Drawing Sheets

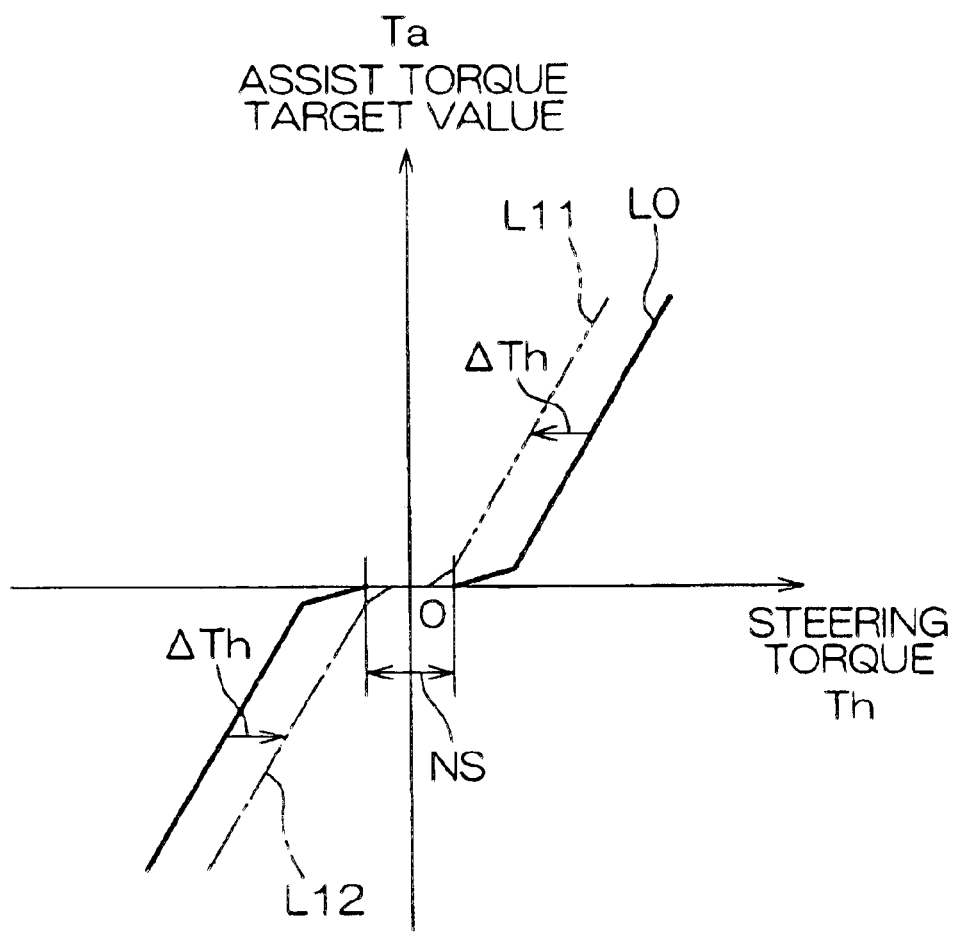

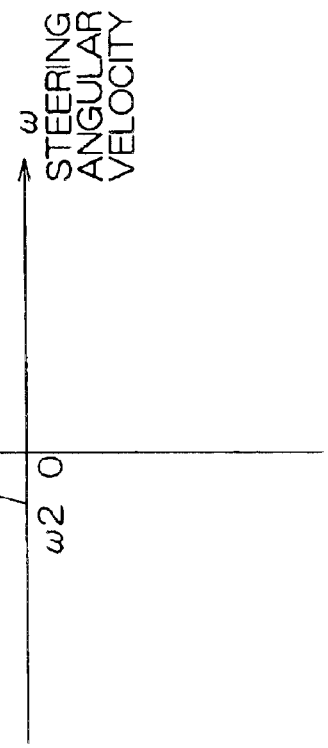
FIG. 3(b) WHEN Th < 0
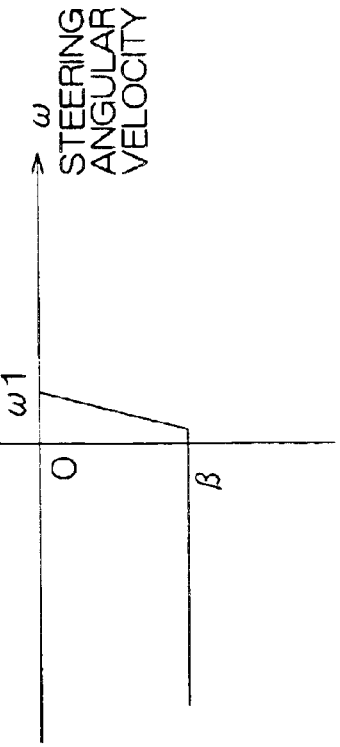
FIG. 3(a) WHEN Th ≥ 0

ELECTRIC POWER STEERING APPARATUS

BACKGROUND OF THE INVENTION

1. Field of the Invention

The present invention relates to an electric power steering apparatus so configured as to transmit a driving force produced by an electric motor to a steering mechanism as a steering assist force.

2. Description of Related Art

Electric power steering apparatuses so configured as to perform steering assist by mechanically transmitting a driving force produced by an electric motor to a steering mechanism by a gear mechanism (a speed reduction mechanism) or a direct drive system have been conventionally employed.

In such electric power steering apparatuses, assist characteristics for determining the relationship between a steering torque applied to a steering wheel and an assist torque target value given to the steering mechanism from the electric motor have been previously determined, and are stored in a memory as an assist map. The assist torque target value corresponding to the steering torque is read out of the assist map, and the electric motor is driven and controlled on the basis of the read assist torque target value.

The assist characteristics are determined such that the larger the steering torque is, the larger the assist torque target value becomes, as shown in FIG. 7. A positive value is assigned to the steering torque with respect to a rightward steering direction, while a negative value is assigned to the steering torque with respect to a leftward steering direction, for example. The assist characteristics are so determined that a positive value of the assist torque target value corresponds to the steering torque taking the positive value, and a negative value of the assist torque target value corresponds to the steering torque taking the negative value.

When the assist torque target value is a positive value, such a steering assist force as to steer a steerable wheel rightward is exerted on the steering mechanism. Conversely, when the assist torque target value is a negative value, such a steering assist force as to steer a steerable wheel leftward is exerted on the steering mechanism. When the steering torque takes a value in a dead zone in the vicinity of zero, the assist torque target value is made zero.

In such electric power steering apparatuses to which such assist characteristics are applied, when return stroke steering for rotating a steering wheel toward a steering angle midpoint is done, such a steering feeling (a so-called spring feeling) that the steering wheel is returned to the steering angle midpoint strongly than a driver intends is produced. That is, when return stroke steering is done, a steering torque is reduced and correspondingly, an assist force is reduced. Accordingly, the steering wheel is returned to the steering angle midpoint strongly by an inverted input from the steerable wheel.

This problem can be solved by increasing the slope of an assist characteristics curve such that a larger assist torque target value is set with respect to the steering torque. In this case, however, a responsive feeling at the time of forward stroke steering is degraded.

SUMMARY OF THE INVENTION

Therefore, the applicant of the present invention has proposed to correct reference assist characteristics on the basis of a steering speed in Japanese Patent Application NO. 2002-160061 previously filed, to provide an electric power steering apparatus so configured as to perform steering assist in accordance with corrected assist characteristics obtained by the correction.

In the electric power steering apparatus according to the prior application, reference assist characteristics are shifted along the axis of coordinates of a steering torque depending on a steering speed, thereby obtaining corrected assist characteristics. More specifically, the shifting direction and the shifting amount of the reference assist characteristics are variably set depending on the direction of the steering speed (equal to a steering direction) and the magnitude thereof, for example. For example, the corrected assist characteristics are found by shifting the reference assist characteristics in the positive direction on the axis of the steering torque when the steering speed takes a positive value, while shifting the reference assist characteristics in the negative direction on the axis of the steering torque when the steering speed takes a negative value as well as determining the shifting amount such that the shifting amount increases monotonously (for example, linearly) depending on the absolute value of the steering speed.

A motor driving target value is set in accordance with the corrected assist characteristics thus obtained, thereby making it possible to set assist characteristics which differ at the time of forward stroke steering and return stroke steering. Consequently, a sufficient responsive feeling can be obtained at the time of forward stroke steering, and a sufficient steering assist force is transmitted to a steering mechanism at the time of return stroke steering, thereby making it possible to cancel such an undesirable steering feeling (spring feeling) that a steering wheel is returned to a neutral position more strongly than a driver intends.

In such a configuration, however, the driver's steering effort on the steering wheel differs depending on the steering speed. Therefore, tuning for optimizing the reference assist characteristics for each vehicle type is difficult.

An object of the present invention is to provide an electric power steering apparatus in which a good steering feeling can be realized, and reference assist characteristics are easy to tune.

An electronic power steering apparatus according to the present invention is an apparatus for performing steering assist by transmitting a driving force produced by an electronic motor to a steering mechanism. The apparatus comprises an operation amount sensor for sensing an operation amount of an operation member for steering a motor vehicle; a reference assist characteristics setting section for setting reference assist characteristics which are reference characteristics of a motor driving target value corresponding to the operation amount sensed by the operation amount sensor; a motor driving target value setting section for setting the motor driving target value corresponding to the operation amount sensed by the operation amount sensor in accordance with corrected assist characteristics obtained by shifting the reference assist characteristics set by the reference assist characteristics setting section along the axis of coordinates of the operation amount; and a motor driving section for driving the electric motor on the basis of the motor driving target value set by the motor driving target value setting section. The apparatus further comprises a shifting amount setting section for setting, when forward stroke steering for operating the operation member in a direction away from a steering angle midpoint is done, the shifting amount of the corrected assist characteristics with respect to the reference assist characteristics to zero, while setting, when return stroke steering for operating the operation member toward the steering angle midpoint is done, the shifting amount of the corrected assist characteristics with respect to the reference assist characteristics to a value at which corrected assist characteristics is obtained in which the absolute value of the motor driving target value corresponding to the operation amount sensed by the operation amount sensor is increased.

According to the present invention, the corrected assist characteristics obtained by correcting the reference assist characteristics set by the reference assist characteristics setting section are applied to the operation amount sensed by the operation amount sensor. That is, the motor driving target value is set in accordance with the corrected assist characteristics.

Although the reference assist characteristics are corrected by shifting the reference assist characteristics along the axis of coordinates of the operation amount, the shifting amount is determined such that the shifting amount is made zero at the time of forward stroke steering (at the time of steering in the direction away from the steering angle midpoint), and that the shifting amount is made a value corresponding to the corrected assist characteristics in which the absolute value of the motor driving target value is made larger than that in the case of the reference assist characteristics at the time of return stroke steering (at the time of steering in the direction nearer to the steering angle midpoint).

More specifically, there is provided a steering speed sensor, for example, for sensing a steering speed by the operation member, and the shifting direction and the shifting amount of the reference assist characteristics are variably set depending on the direction of the steering speed (equal to a steering direction) sensed by the steering speed sensor and the magnitude thereof. For example, it is assumed that a steering torque sensed by a steering torque sensor which is an example of the operation amount sensor takes a positive value with respect to a rightward steering direction, while taking a negative value with respect to a leftward steering direction. In the reference assist characteristics, it is assumed that a positive value of the motor driving target value is assigned to the steering torque value taking the positive value, while a negative value of the motor driving target value is assigned to the steering torque value taking the negative value. Further, the steering speed takes a positive value with respect to the rightward steering direction, while taking a negative value with respect to the leftward steering direction.

In this case, in a case where the steering torque is not less than zero, for example, the shifting amount may be made zero when the steering speed takes a positive value of not less than a first predetermined value (at the time of forward stroke steering), while being determined depending on the steering speed when the steering speed takes a value of less than the first predetermined value. At this time, the reference assist characteristics may not be shifted in the positive direction on the axis of coordinates of the steering torque, but may be exclusively shifted in the negative direction on the axis of coordinates of the steering torque. That is, the shifting amount may be determined such that its value in a case where the steering speed takes the first predetermined value is zero and such that it decreases monotonously (for example, in a stepped shape or linearly), as the steering speed decreases, to a negative lower-limit value with respect to the steering speed which is less than the first predetermined value. In the reference assist characteristics, therefore, a portion in a range of the steering torque taking the positive value is shifted toward the origin, so that the steering assist force increases, thereby making it possible to improve a spring feeling at the time of return stroke steering. The above-mentioned predetermined value may be determined to be not less than zero. If the first predetermined value is set to a positive value, however, the steering assist force can be increased in a steering hold-on state where the steering speed becomes approximately zero, thereby making it possible to reduce a steering burden on a driver in the steering hold-on state. Further, in a return stroke steering state where the steering speed takes a negative value, the shifting amount may be variably set depending on the steering speed, or may be fixed to the negative lower-limit value irrespective of the steering speed.

In a case where the steering torque takes a negative value, the shifting amount may be made zero when the steering speed takes a negative value of not more than a second predetermined value, while being determined depending on the steering speed when the steering speed takes a value exceeding the second predetermined value. At this time, the reference assist characteristics may not be shifted in the negative direction on the axis of coordinates of the steering torque, but may be exclusively shifted in the positive direction on the axis of coordinates of the steering torque. That is, the shifting amount may be determined such that its value in a case where the steering speed takes a second predetermined value is zero and such that it increases monotonously (for example, in a stepped shape or linearly), as the steering speed increases, to a positive upper-limit value with respect to the steering speed exceeding the second predetermined value. In the reference assist characteristics, therefore, a portion in a range of the steering torque taking the negative value is shifted toward the origin, so that the steering assist force increases, thereby making it possible to improve a spring feeling at the time of return stroke steering. The above-mentioned second predetermined value may be determined to be not more than zero. If the second predetermined value is set to a negative value, the steering assist force can be increased in a steering hold-on state where the steering speed becomes approximately zero, thereby making it possible to reduce a steering burden on a driver in the steering hold-on state. In a return stroke steering state where the steering speed takes a positive value, the shifting amount may be variably set depending on the steering speed, or may be fixed to a positive upper-limit value irrespective of the steering speed.

The motor driving target value is set in accordance with the corrected assist characteristics thus obtained, so that different assist characteristics can be set at the time of forward stroke steering and at the time of return stroke steering. Consequently, a sufficient responsive feeling can be obtained at the time of forward stroke steering, and a sufficient steering assist force is transmitted to the steering mechanism at the time of return stroke steering, thereby making it possible to cancel such an undesirable steering feeling (spring feeling) that a steering wheel is returned to a neutral position more strongly than the driver intends. Moreover, at the time of forward stroke steering, a reference assist map is used as it is. Therefore, a steering burden does not vary depending on the steering speed, so that the reference assist map is easy to tune.

The electric power steering apparatus may further comprise a vehicle speed sensor for sensing the vehicle speed of the motor vehicle equipped with the electric power steering apparatus, and a vehicle speed adaptive shifting amount setting section for variably setting the shifting amount of the corrected assist characteristics with respect to the reference assist characteristics depending on the vehicle speed sensed by the vehicle speed sensor.

In this configuration, the shifting amount of the reference assist characteristics can be variably set depending on the vehicle speed. Accordingly, this can cope with a case where it is not so necessary to correct the assist characteristics, for example, a steering operation at the time of a stop or at the time of low-speed traveling.

The electric power steering apparatus may further comprise a steering torque sensor for sensing the steering torque applied to the operation member (which may be shared with the above-mentioned operation amount sensor), and a steering torque adaptive shifting amount setting section for variably setting the shifting amount of the corrected assist characteristics with respect to the reference assist characteristics depending on the steering torque sensed by the steering torque sensor.

By this configuration, when the steering torque takes a small value in the vicinity of zero, for example, the shifting amount can be restrained or reduced to zero. Consequently, it is possible to restrict steering assist in a very small steering torque range where no steering assist is required.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram for explaining reference assist characteristics and corrected assist characteristics obtained by shifting the reference assist characteristics along the axis of coordinates of a steering torque;

FIGS. 3(a) and 3(b) are diagrams showing the relationship of a reference shifting amount to a steering angular velocity;

DESCRIPTION OF THE PREFERRED EMBODIMENTS

Figure 1:
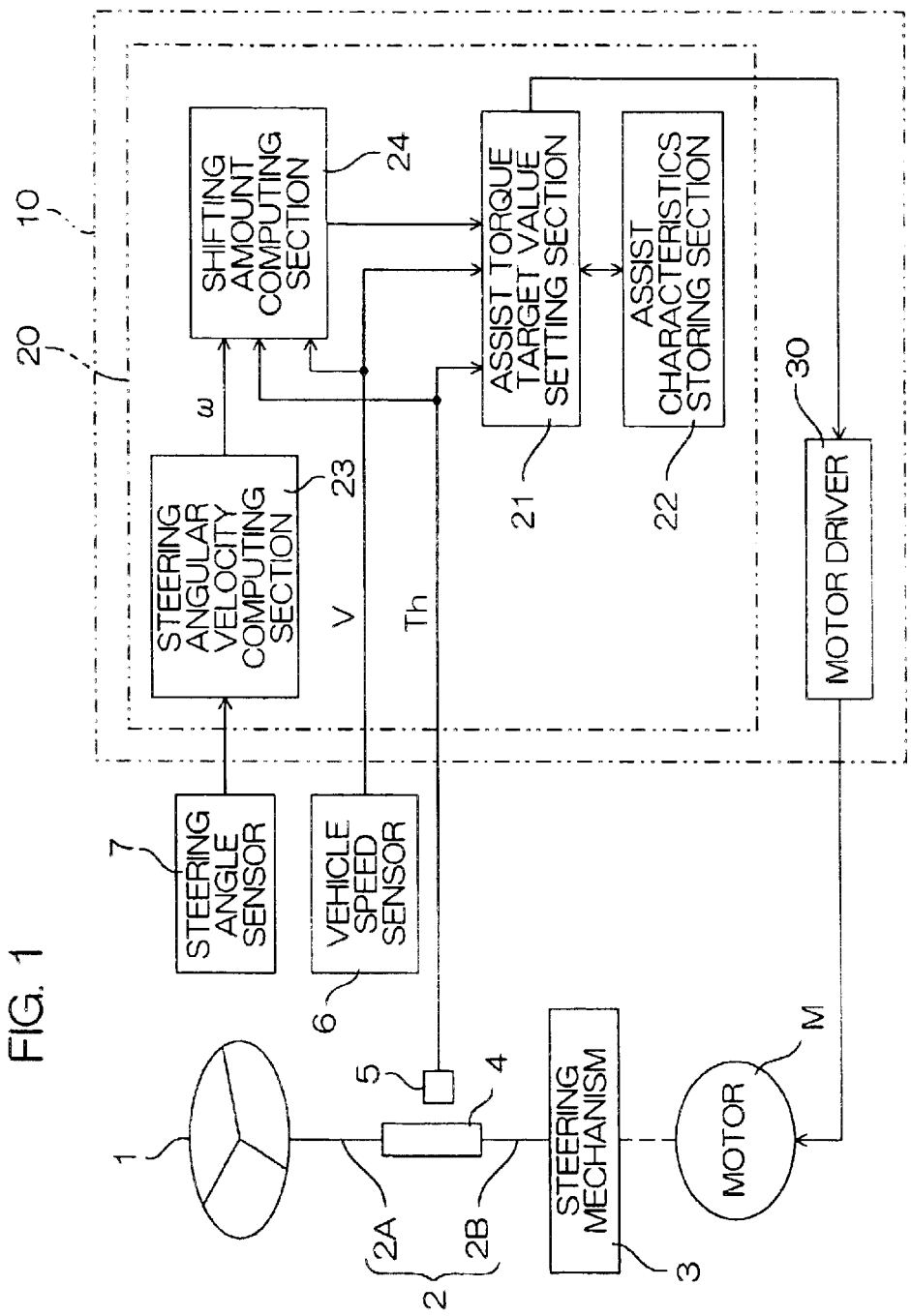
FIG. 1 is a block diagram showing the electrical configuration of an electric power steering apparatus according to an embodiment of the present invention.

FIG. 1 is a block diagram showing the electrical configuration of an electric power steering apparatus according to an embodiment of the present invention. A steering torque applied to a steering wheel 1 serving as an operation member is mechanically transmitted to a steering mechanism 3 including a rack shaft through a steering shaft 2. A steering assist force is mechanically transmitted to the steering mechanism 3 from an electric motor M through a driving force transmitting mechanism such as a gear mechanism (a speed reduction mechanism) or a direct drive system.

The steering shaft 2 is divided into an input shaft 2A coupled to the steering wheel 1 and an output shaft 2B coupled to the steering mechanism 3. The input shaft 2A and the output shaft 2B are connected to each other by a torsion bar 4. The torsion bar 4 causes distortion depending on the steering torque. The direction and the amount of the distortion are sensed by a torque sensor 5.

The torque sensor 5 is of a magnetic type, for example, for sensing a magnetoresistance which varies depending on the change in the positional relationship in the direction of rotation between the input shaft 2A and the output shaft 2B. An output signal of the torque sensor 5 is inputted to a controller 10 (ECU: Electronic Control Unit).

An output signal of a vehicle speed sensor 6 for sensing the traveling speed of a motor vehicle equipped with the electric power steering apparatus and an output signal of a steering angle sensor 7 for sensing the steering angle of the steering wheel 1 (e.g., a rotation angle of the input shaft 2A) are further inputted to the controller 10.

The controller 10 determines an assist torque target value to be given to the steering mechanism 3 from the electric motor M depending on a steering torque sensed by the torque sensor 5, a vehicle speed sensed by the vehicle speed sensor 6, and an output of the steering angle sensor 7, in order to drive and control the electric motor M such that a steering assist force corresponding to the steering torque and the like is applied to the steering mechanism 3.

The controller 10 has a microprocessor 20 and a motor driver 30 for driving the electric motor M on the basis of a control signal from the microprocessor 20.

The microprocessor 20 comprises an assist torque target value setting section 21 which is a functional processing unit realized by executing program-based processing, and an assist characteristics storing section 22 composed of a storage area of a memory in the microprocessor 20. The assist characteristics storing section 22 stores a plurality of reference assist maps respectively corresponding to a plurality of reference assist characteristics previously determined with respect to a plurality of vehicle speed areas. The reference assist characteristics are obtained by determining reference characteristics of an assist torque target value corresponding to a steering torque, and the reference value of the assist torque target value is stored in the assist characteristics storing section 22 in the form of an assist map (a table) in correspondence with the values of a plurality of steering torques.

The microprocessor 20 further comprises a steering angular velocity computing section 23 for computing a steering angular velocity on the basis of the output signal of the steering angle sensor 7, and a shifting amount computing section 24 for computing a shifting amount in a case where the reference assist characteristics are shifted along the axis of coordinates of the steering torque to obtain virtual corrected assist characteristics. The shifting amount computing section 24 computes a shifting amount for obtaining virtual corrected assist characteristics obtained by shifting the reference assist characteristics along the axis of coordinates of the steering torque on the basis of a steering angular velocity ω computed by the steering angular velocity computing section 23, a vehicle speed V sensed by the vehicle speed sensor 6, and a steering torque Th sensed by the torque sensor 5.

The assist torque target value setting section 21 reads out an assist torque target value Ta corresponding to the corrected assist characteristics from the assist characteristics storing section 22 on the basis of the steering torque Th sensed by the torque sensor 5, the vehicle speed V sensed by the vehicle speed sensor 6, and a shifting amount ΔTh computed by the shifting amount computing section 24 (its sign represents a shifting direction, and its absolute value represents a shifting length). The motor driver 30 supplies a necessary and sufficient driving electric current to the electric motor M on the basis of the read assist torque target value Ta.

FIG. 2 is a diagram for explaining reference assist characteristics corresponding to the reference assist map stored in the assist characteristics storing section 22 and corrected assist characteristics obtained by shifting the reference assist characteristics along the axis of coordinates of the steering torque.

The steering torque Th sensed by the torque sensor 5 takes a positive value when a torque for rightward steering is applied to the steering wheel 1, while taking a negative value when a torque for leftward steering is applied to the steering wheel 1. The reference assist characteristics are indicated by a curve L0 in FIG. 2. The reference assist characteristics are so determined that a positive value of the assist torque target value Ta corresponds to the steering torque Th taking the positive value, and a negative value of the assist torque target value Ta corresponds to the steering torque Th taking the negative value. Although as described in the foregoing, the assist characteristics storing section 22 stores a plurality of reference assist maps corresponding to a plurality of vehicle speed areas, one reference assist characteristics applied in a certain vehicle speed area are illustrated in FIG. 2 for simplicity of illustration.

In the reference assist characteristics indicated by the curve L0, the assist torque target value Ta is set to zero irrespective of the value of the steering torque Th in the vicinity of Th=0. Such a range of the steering torque is a dead zone NS.

In the present embodiment, the assist torque target value Ta is set on the basis of virtual corrected assist characteristics (e.g., characteristics indicated by curves L11 and L12) obtained by shifting the reference assist characteristics along the axis of coordinates of the steering torque Th (in the positive direction or the negative direction) by the shifting amount $\Delta Th$ computed by the shifting amount computing section 24 on the basis of the steering angular velocity $\omega$ computed by the steering angular velocity computing section 23, the vehicle speed V, and the steering torque Th.

However, the reference assist characteristics are shifted only in the negative direction on the axis of coordinates of the steering torque Th in situations where the steering torque Th is not less than zero (see the curve L11), while being shifted only in the positive direction on the axis of coordinates of the steering torque Th in situations where the steering torque Th takes a negative value (see the curve L12), as described below.

FIGS. 3($a$) and 3($b$) are diagrams for explaining the function of the shifting amount computing section 24, where the relationship of a reference shifting amount $\Delta Th_B$ to a steering angular velocity $\omega$. The shifting amount computing section 24 multiples the reference shifting amount $\Delta Th_B$ by a vehicle speed gain $G_V$ and a torque gain $G_T$, described later, to find a shifting amount $\Delta Th$ (=$G_V \times G_T \times \Delta Th_B$).

The shifting amount computing section 24 has a memory storing a table corresponding to a curve (a polygonal line in this example) of the characteristics shown in FIGS. 3($a$) and 3($b$), for example. The shifting amount computing section 24 determines the reference shifting amount $\Delta Th_B$ in accordance with a table of characteristics shown in FIG. 3($a$) when the steering torque Th satisfies Th$\geq$0, while determining the reference shifting amount $\Delta Th_B$ in accordance with a table of characteristics shown in FIG. 3($b$) when the steering torque Th satisfies Th<0.

In the table of the characteristics shown in FIG. 3($a$) applied when Th$\geq$0, the reference shifting amount $\Delta Th_B$ which is zero or negative is set in a range where the steering angle velocity $\omega$ is not more than a first predetermined value $\omega 1$ (>0). More specifically, in a range where the steering angular velocity $\omega$ is not more the first predetermined value $\omega 1$, the reference shifting amount $\Delta Th_B$ is so set as to decrease monotonously (linearly in the example shown in FIG. 3($a$)) using a lower-limit value $\beta$ (where $\beta$<0) as a lower limit as the steering angular velocity u decreases. Contrary to this, in a range where the steering angular velocity $\omega$ exceeds the first predetermined value $\omega 1$, the reference shifting amount $\Delta Th_B$ satisfies $\Delta Th_B$=0 without depending on the steering angular velocity $\omega$.

On the other hand, in the table of the characteristics shown in FIG. 3($b$) applied when Th<0, the reference shifting amount $\Delta Th_B$ which is zero or positive is set in a range where the steering angular velocity $\omega$ is not less than a second predetermined value $\omega 2$ (where $\omega 2$<0. For example, $|\omega 2|=\omega 1$.) In the foregoing range, the reference shifting amount $\Delta Th_B$ which is zero or positive is set. More specifically, in a range where the steering angular velocity $\omega$ is not less than the second predetermined value $\omega 2$, the reference shifting amount $\Delta Th_B$ is so set as to increase monotonously (linearly in the example shown in FIG. 3($b$)) using an upper-limit value $\alpha$ (where $\alpha$<0. For example, $\alpha=|\beta|$.) as an upper limit as the steering angular velocity $\omega$ increases. Contrary to this, in a range where the steering angular velocity $\omega$ is less than the second predetermined value $\omega 2$, the reference shifting amount $\Delta Th_B$ satisfies $\Delta Th_B$=0 without depending on the steering angular velocity $\omega$.

At the time of forward stroke steering in which the direction of the steering torque Th and the direction of the steering angular velocity $\omega$ coincide with each other (at the time of steering in a direction away from a steering angle midpoint), the reference shifting amount $\Delta Th_B$ becomes zero. On the other hand, at the time of return stroke steering in which the direction of the steering torque Th and the direction of the steering angular velocity $\omega$ not coincide with each other (at the time of steering in a direction nearer to the steering angle midpoint), the reference shifting amount $\Delta Th_B$ is so determined that the reference assist characteristics are shifted in a direction nearer to the origin along the axis of coordinates of the steering torque. Further, when the steering angular velocity w takes a value in the vicinity of zero ($\omega 2$<$\omega$<$\omega 1$) the reference shifting amount $\Delta Th_B$ is so determined that the reference assist characteristics are shifted in the direction nearer to the origin along the axis of coordinates of the steering torque.

In such a manner, at the time of forward stroke steering, the reference assist characteristics are not shifted. Therefore, a steering burden does not vary depending on the steering angular velocity, the reference assist characteristics can be easily tuned, and a sufficient responsive feeling can be given to a driver. On the other hand, at the time of return stroke steering and at the time of hold-on steering, a spring feeling at the time of return stroke steering can be canceled by shifting the reference assist characteristics toward the origin, and a good steering feeling can be realized by reducing a steering burden at the time of hold-on steering.

Figure 4:
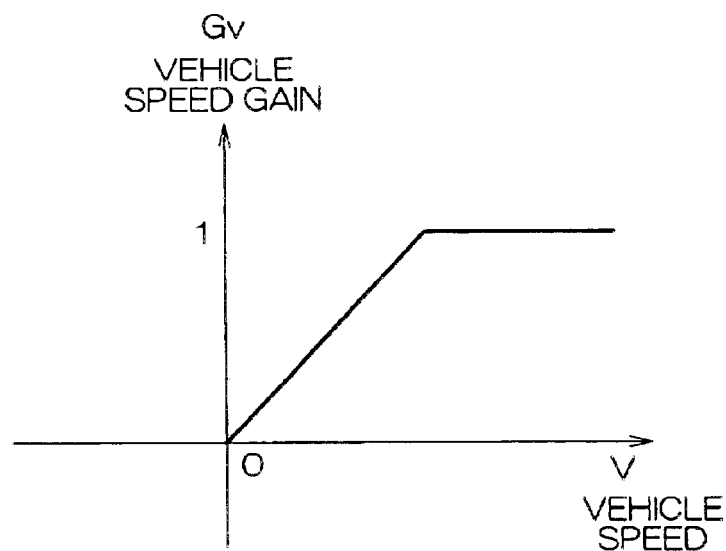
FIG. 4 is a diagram for explaining variable setting of a shifting amount with respect to a vehicle speed.
Figure 5:
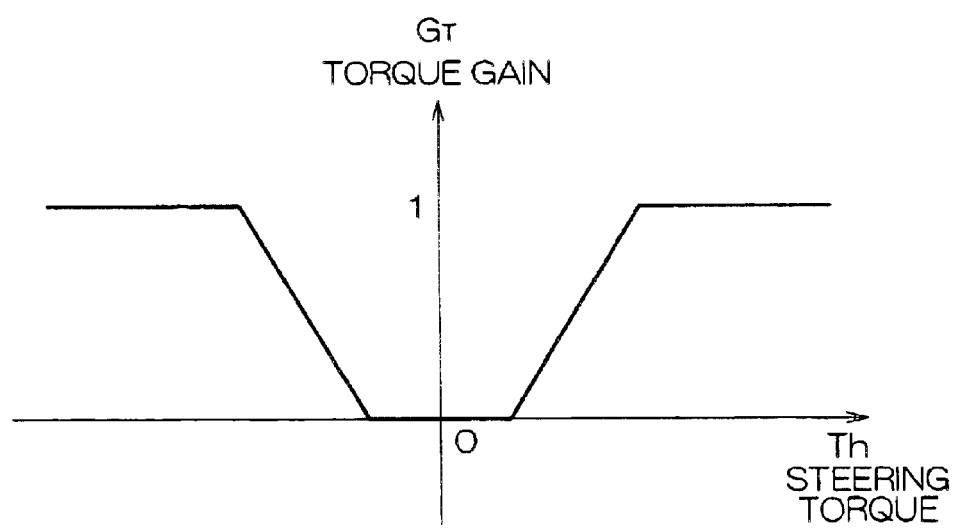
FIG. 5 is a diagram for explaining variable setting of a shifting amount with respect to a steering torque.

FIG. 4 is a diagram for explaining variable setting of a shifting amount $\Delta Th$ corresponding to a vehicle speed V, and FIG. 5 is a diagram for explaining variable setting of a shifting amount $\Delta Th$ corresponding to a steering torque Th. The shifting amount computing section 24 finds a reference shifting amount $\Delta Th_B$ in accordance with the characteristics shown in FIG. 3, and further multiples the reference shifting amount $\Delta Th_B$ by a vehicle speed gain $G_V$ determined in accordance with characteristics shown in FIG. 4 and a torque gain $G_T$ determined in accordance with characteristics shown in FIG. 5, to find a shifting amount ΔTh (=ΔTh$_B$× G$_V$×G$_T$). The assist torque target value setting section 21 retrieves the reference assist map stored in the assist characteristics storing section 22 using the shifting amount ΔTh, thereby reading out an assist torque target value Ta conforming to corrected assist characteristics which are virtually determined depending on a steering angular velocity a, a vehicle speed V, and a steering torque Th.

The vehicle speed gain G$_V$ is so determined as to increase monotonously (linearly in this example) using a predetermined upper-limit value ("1" in the example shown in FIG. 4) as an upper limit as the vehicle speed V increases when the vehicle speed V is in a range from zero to a predetermined speed.

This can also cope with a case where the assist characteristics need not be so corrected, for example, a steering operation at the time of a stop or at the time of low-speed traveling.

On the other hand, the torque gain G$_T$ uses a region in the vicinity of the steering torque Th=0 as a dead zone, and is so set as to increase monotonously (linearly in this example) using a predetermined upper-limit value ("1" in this example) as an upper limit as the absolute value of the steering torque Th increases outside the dead zone. Consequently, steering assist in a range where no steering assist is required in the vicinity of the steering torque Th=0 is restricted.

On the basis of the shifting amount ΔTh determined in the foregoing manner, the assist torque target value Ta is determined in accordance with virtual corrected assist characteristics obtained by shifting the reference assist characteristics by the shifting amount ΔTh along the axis of coordinates of the steering torque.

More specifically, when it is assumed that the reference assist characteristics are represented by Ta=f (Th) using a function f, a value obtained by subtracting the shifting amount ΔTh from the steering torque Th sensed by the torque sensor 5 is used as a steering torque value for assist map retrieval Th* (that is, Th*=Th−ΔTh) and the reference assist map stored in the assist characteristics storing section 22 may be retrieved using the steering torque value for retrieval Th*. Consequently, the assist torque target value Ta (=f(Th*)) can be determined in accordance with the virtual corrected assist characteristics.

Figure 6:
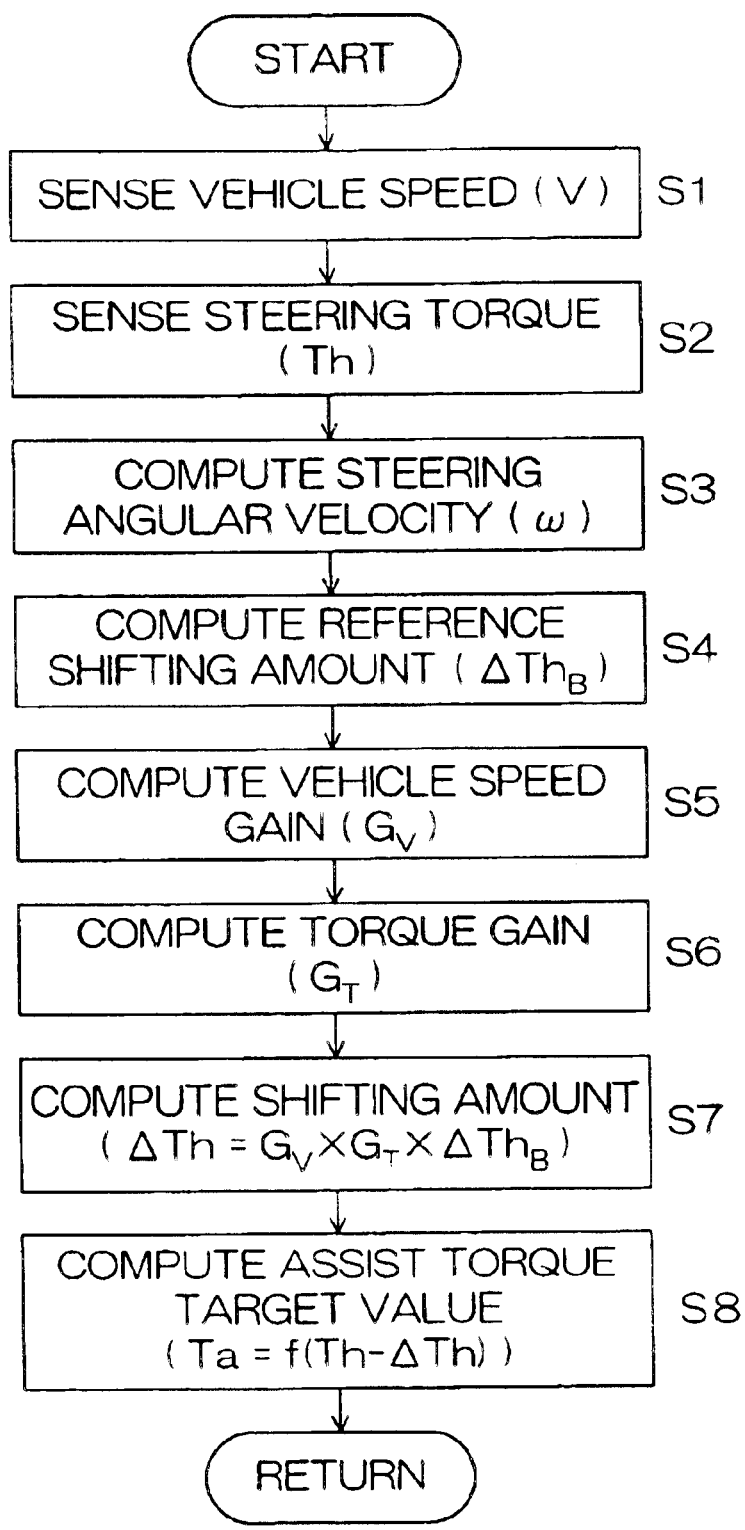
FIG. 6 is a flow chart for explaining processing related to driving control of an electric motor by a microprocessor.
Figure 7:
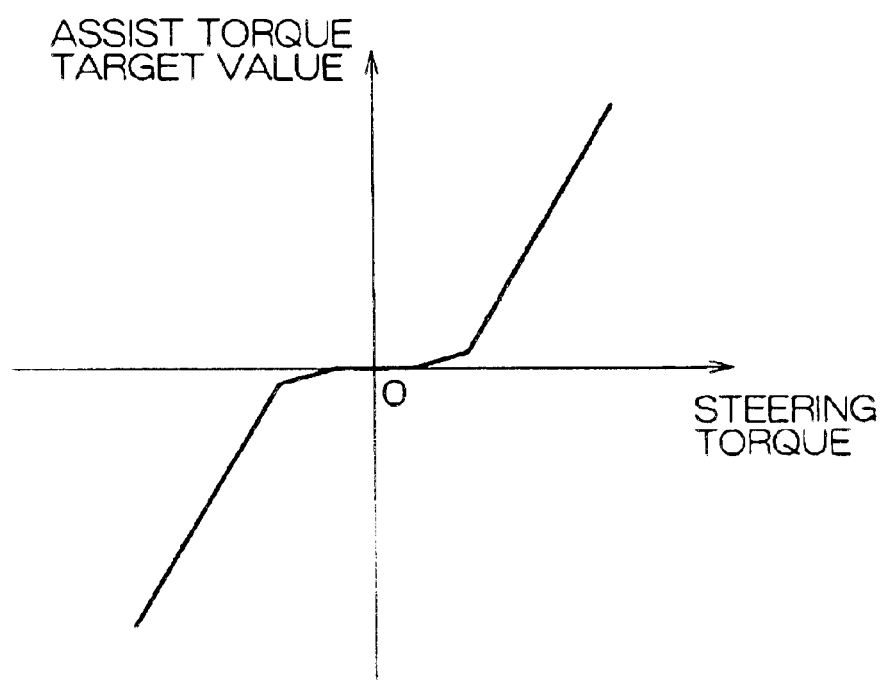
FIG. 7 is a diagram showing an example of assist characteristics.

FIG. 6 is a flow chart for explaining the function of the microprocessor 20. The microprocessor 20 reads a vehicle speed V sensed by the vehicle speed sensor 6 and a steering torque Th sensed by the torque sensor 5 (steps S1 and S2) Further, an output signal of the steering angle sensor 7 is read, thereby finding a steering angular velocity ω by the steering angular velocity computing section 23 (step 3). The shifting amount computing section 24 reads out a reference shifting amount ΔTh$_B$ corresponding to the found steering angular velocity ω on the basis of the steering angular velocity ω (step S4). Further, the shifting amount computing section 24 finds a vehicle speed gain G$_V$ on the basis of the vehicle speed V sensed by the vehicle speed sensor 6 (step S5). Further, the shifting amount computing section 24 finds a torque gain G$_T$ on the basis of the steering torque Th sensed by the torque sensor 5 (step S6). The shifting amount ΔTh is computed by multiplying the reference shifting amount ΔTh$_B$ by the vehicle speed gain G$_V$ and the torque gain G$_T$ thus found (step S7)

The found shifting amount ΔTh is given to the assist torque target value setting section 21. The assist torque target value setting section 21 finds the steering torque value for retrieval Th* as Th*←Th−ΔTh, and retrieves the reference assist map stored in the assist characteristics storing section 22 on the basis of the steering torque value for retrieval Th* (step S8).

In such a manner, an assist torque value Ta conforming to virtual corrected assist characteristics obtained by shifting reference assist characteristics along the axis of coordinates of the steering torque by the shifting amount ΔTh is read out of the assist characteristic storing section 22. The motor driver 30 is controlled on the basis of the read assist characteristic target value Ta, and the motor M produces a driving force corresponding thereto, to supply the produced driving force to the steering mechanism 3.

Although description has been made of one embodiment of the present invention, the present invention can be also embodied in another embodiment. Although in the above-mentioned embodiment, the vehicle speed V and the steering torque Th are considered with respect to the shifting amount ΔTh of the assist characteristics, variable setting of a shifting amount dependent on the vehicle speed V and the steering torque Th is not necessarily required. That is, the reference shifting amount ΔTh$_B$ in the above-mentioned embodiment may be used as it is as the shifting amount ΔTh, only the vehicle speed gain G$_V$ maybe multiplied by the reference shifting amount ΔTh$_B$ without using the torque gain G$_T$ to find a shifting amount ΔTh, and only the torque gain G$_T$ maybe multiplied by the reference shifting amount ΔTh$_B$ without using the vehicle speed gain G$_V$ to find a shifting amount ΔTh.

Although in the above-mentioned embodiment, the assist map corresponding to the reference assist characteristics is stored in the assist characteristics storing section 22, to read out the assist torque target value Ta from the assist map, the assist torque target value Ta corresponding to the steering torque value for retrieval Th* may be determined by a functional operation.

The same is true for the shifting amount computing section 24. The characteristics of the reference shifting amount ΔTh$_B$ corresponding to the steering angular velocity ω may be previously stored in the memory, or the reference shifting amount ΔTh$_B$ corresponding to the steering angular velocity ω may be found by a functional operation. The same is true for operations of the vehicle speed gain G$_V$ corresponding to the vehicle speed V and the torque gain G$_T$ corresponding to the steering torque Th.

Although in the above-mentioned embodiment, description has been made using the assist torque target value as a motor driving target value and using the characteristics of the assist torque target value corresponding to the steering torque as assist characteristics, the present invention is not limited to the same. For example, a motor current target value or a motor voltage target value may be taken as a motor driving target value, and the relationship between the steering torque and the motor current target value or the motor voltage target value may be taken as assist characteristics.

Furthermore, although in the above-mentioned embodiment, the steering angle sensed by the steering angle sensor 7 is subjected to time differential to compute the steering angular velocity, a counter-electromotive force produced between terminals of the electric motor M may be found on the basis of an output of a motor current detection circuit for finding a motor current flowing through the electric motor M and an output of a between-terminals voltage detection circuit for detecting a voltage between the terminals of the electric motor M without using a steering angle sensor, in order to estimate a steering angular velocity corresponding thereto.

Although the present invention has been described and illustrated in detail, it is clearly understood that the same is by way of illustration and example only and is not to be taken by way of limitation, the spirit and scope of the present invention being limited only by the terms of the appended claims.

The present application corresponds to Japanese application NO. 2003-51539 filed with the Japanese Patent Office on Feb. 27, 2003, the disclosure of which is hereinto incorporated by reference.

What is claimed is:

1. An electric power steering apparatus for performing steering assist by transmitting a driving force produced by an electric motor to a steering mechanism, comprising:

an operation amount sensor for sensing an operation amount of an operation member for steering a motor vehicle; and a reference assist characteristics setting section for setting reference assist characteristics which are reference characteristics of a motor driving target value corresponding to the operation amount sensed by the operation amount sensor;

a motor driving target value setting section for setting a motor driving target value corresponding to the operation amount sensed by the operation amount sensor in accordance with corrected assist characteristics obtained by shifting the reference assist characteristics set by the reference assist characteristics setting section along an axis of coordinates of the operation amount;

a shifting amount setting section for setting, when forward stroke steering for operating the operation member in a direction away from a steering angle midpoint is done, a shifting amount of the corrected assist characteristics with respect to the reference assist characteristics to zero, while setting, when return stroke steering for operating the operation member toward the steering angle midpoint is done, the shifting amount of the corrected assist characteristics with respect to the reference assist characteristics to a value at which corrected assist characteristics is obtained in which an absolute value of the motor driving target value corresponding to the operation amount sensed by the operation amount sensor is increased; and a motor driving section for driving the electric motor on the basis of the motor driving target value set by the motor driving target value setting section.

2. The electric power steering apparatus according to claim 1, further comprising:

a steering speed sensor for sensing a steering speed by the operation member, the shifting amount setting section variably setting a shifting direction and the shifting amount of the reference assist characteristics depending on a direction and a magnitude of the steering speed sensed by the steering speed sensor.

3. The electric power steering apparatus according to claim 2, wherein the operation amount sensor is a steering torque sensor for sensing a steering torque applied to the operation member, the steering torque sensed by the steering torque sensor takes a positive value with respect to a first steering direction which is either one of rightward and leftward directions, while taking a negative value with respect to a second steering direction which is the other direction, a positive value of the motor driving target value is assigned to the steering torque value taking a positive value, while a negative value of the motor driving target value is assigned to the steering torque value taking a negative value in the reference assist characteristics, the steering speed sensed by the steering speed sensor takes a positive value with respect to the first steering direction, while taking a negative value with respect to the second steering direction, the shifting amount setting section setting, in a case where the steering torque sensed by the steering torque sensor is not less than zero, the shifting amount to zero when the steering speed sensed by the steering speed sensor takes a positive value of not less than a first predetermined value, while setting the shifting amount depending on the steering speed when the steering speed takes a value of less than the first predetermined value, and setting, in a case where the steering torque sensed by the steering torque sensor takes a negative value, the shifting amount to zero when the steering speed sensed by the steering speed sensor takes a negative value of not more than a second predetermined value, while setting the shifting amount depending on the steering speed when the steering speed takes a value exceeding the second predetermined value.

4. The electric power steering apparatus according to claim 1, further comprising:

a vehicle speed sensor for sensing a vehicle speed of the motor vehicle equipped with the electric power steering apparatus, the shifting amount setting section including a vehicle speed adaptive shifting amount setting section for variably setting the shifting amount of the corrected assist characteristics with respect to the reference assist characteristics depending on the vehicle speed sensed by the vehicle speed sensor.

5. The electric power steering apparatus according to claim 1, further comprising:

a steering torque sensor for sensing the steering torque applied to the operation member, the shifting amount setting section including a steering torque adaptive shifting amount setting section for variably setting the shifting amount of the corrected assist characteristics with respect to the reference assist characteristics depending on the steering torque sensed by the steering torque sensor.

* * * * *